CALL AWAITING SIGNAL TELEPHONE CIRCUITS
Filed Sept. 18, 1961
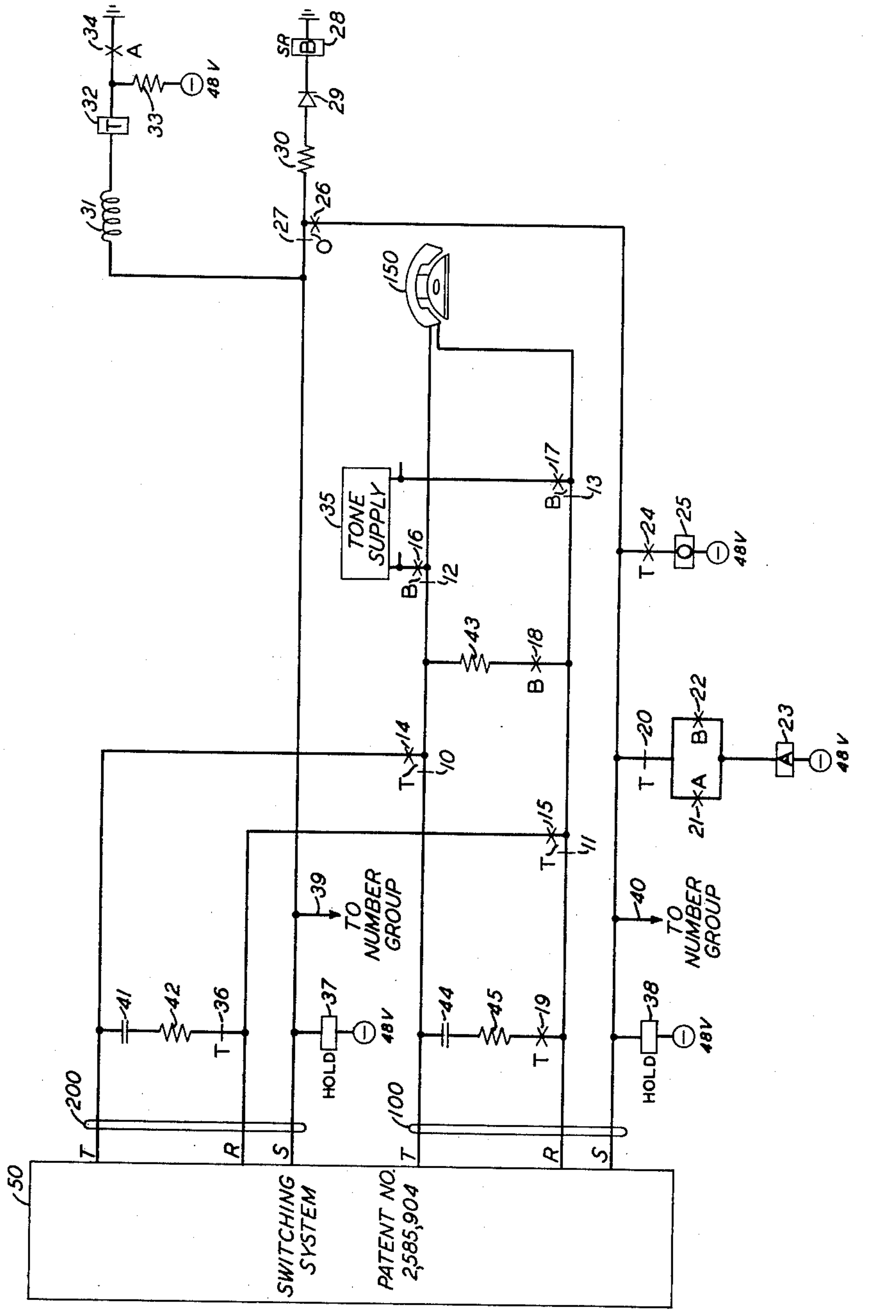
INVENTOR
A. ZAROUNI
BY
William F. Simpson
ATTORNEY 3,133,995
CALL AWAITING SIGNAL TELEPHONE CIRCUITS
Alfred Zarouni, Brooklyn, N.Y., assignor to Bell Telephone Laboratories, Incorporated, New York, N.Y., a corporation of New York
Filed Sept. 18, 1961, Ser. No. 138,640
2 Claims. (Cl. 179—84)

This invention relates to telephone switching systems and more particularly to automatic telephone switching systems wherein it is desired to indicate to a busy called subscriber that another party is attempting to place a call to him.

In usual telephone systems when a subscriber is engaged on a telephone call, any other party attempting to reach his call receives a busy tone indicating the fact that the subscriber is priorly connected. The subscriber himself, however, is unaware of the attempt being made to reach him. In some instances the telephone subscriber may be engaged on a call of little importance while the incoming blocked call is one of considerable importance and one which he is anxious to receive. Accordingly, a number of arrangements have been suggested in the past to advise the called subscriber of the presence of this second call.

Such prior arrangements, however, have generally involved considerable modification of the existing telephone plant. Such modifications, including special signaling arrangements at each calling telephone, may prove acceptable in certain small installations, such as private branch exchanges, but would prevent any system dependent thereon from having applicability in the general telephone systems wherein each subscriber is connected to a central office and connectable therethrough to the millions of telephones of our present day telephone network. Additionally, it is obvious that any major modifications in the existing telephone plant would render such a system prohibitively expensive.

Accordingly, an object of this invention is to improve the telephone service supplied to a telephone subscriber by advising him of the presence of another call when his telephone is in use.

Another object of this invention is to provide such service without the necessity of special signaling on the part of the calling party and without major modification of the equipment in the central office to which the subscriber is connected. Specifically it is an object of this invention to provide such service without modifying the markers or registers of the common control equipment in the central office.

These and other objects of this invention are attained in accordance with one illustrative embodiment thereof by transmitting a tone to a telephone subscriber when the telephone is in use indicating that there is another call waiting. Specifically in accordance with my invention each subscriber to whom this service is extended is provided with an auxiliary line circuit which includes a second set of line terminals to which the second calling party is connected by the central office equipment. The new calling party hears regular ringing induction tone just as though the line he called were idle. At the same time as seizure of the second set of line terminals the auxiliary line circuit causes a short burst of tone to be applied to the called subscriber's line indicating to him that a second party is attempting to reach him.

If the busy subscriber upon being advised of the presence of the second call wishes to receive it, he may terminate his present call. Upon hanging up on his prior connection, ringing is applied to his line. When the called subscriber picks up his phone in response to this ringing he is, in accordance with my invention, automatically connected to the new called party by the auxiliary line circuit auxiliary line appearance in the central office. In this specific illustrative embodiment the other line terminals may then be seized by another calling party, the called subscriber again alerted, and the above procedures followed if the called party desires to terminate the present call, over the second set of line terminals, and receive the call waiting on his basic line circuit.

If the new calling party tired of waiting for the subscriber to terminate his present call and then answer, he would hang up before the called party returned to an on-hook condition in which case the circuit would be restored to normal and the called party not rung when he did hang up.

A feature of my invention relates to the multiple-line appearances or sets of switching terminals or line terminals in the switching equipment at an automatic dial control telephone switching center. The line terminals are arranged so that both sets of terminals may be preferred line terminals with the other set the second choice line terminals. The multiple-line terminals are thus arranged so that if the first choice is busy the automatic switching equipment will automatically switch calls to the second choice or line appearance.

As this switching to the second set of line terminals is automatically done by the central office equipment, no special signaling is required from the calling party. Further by providing a second line appearance in the central office, no modifications need be made in the major components of the central office, such as in the markers and registers in a crossbar telephone office. Instead the sleeves of both line appearances are extended to the number group, in the crossbar office, so that the central office can hunt to the alternate line appearance if the first line appearance is busy. Such a procedure is presently followed in central offices for different purposes, such as PBX line hunting, and accordingly the present day central offices are currently equipped to operate in this manner.

Another feature of the invention relates to preventing the tone applied to the subscriber's line from being transmitted to the other party of the first or previously established connection. In this manner a calling party, who is also provided with this service, would not erroneously believe that a call was waiting for him too, as could be the case if both parties on the prior connection heard the alerting tone.

It is a further feature of my invention to provide circuits for automatically interconnecting the subscriber's line with the second set of line terminals when a call is waiting on them and the subscriber finishes or terminates the first or previously established connection.

A still further feature of my invention relates to circuit arrangements wherein either set of line terminals may be considered the regular line appearance for receiving calls and the other line appearance as the auxiliary line terminals, which line treminals are at the automatic switching center or central office. Thus, if a third call should arrive when the subscriber is busy with the second, it is directed to the first set of line terminals and the momentary spurt of call waiting tone sent to the subscriber, thereafter permitting the subscriber either to continue the second call or to terminate the second call and accept the third call. This series of operations will be repeated indefinitely so that as the subscriber is talking on a connection utilizing one set of line terminals, the next call may be held waiting at the other set of line terminals while the subscriber is alerted.

It is a still further feature of this invention that the operation of the system is independent of whether the called subscriber originally initiated the prior call or merely received the prior call.

A complete understanding of this invention and of these and various other features thereof may be gained from consideration of the following detailed description and the accompanying drawing, the sole figure of which is a schematic representation of one specific illustrative embodiment of my invention.

Turning now to the drawing, the sole figure thereof shows the circuit details of an auxiliary line circuit in accordance with my invention for providing call waiting notification and call waiting holding for a subscriber to whom this service is available. The circuitry of my invention depicted in the drawing is arranged for cooperation with a No. 5 crossbar switching system, such as disclosed in Patent 2,585,904, granted to A. J. Busch, February 19, 1952, when modified in accordance with the article entitled, "Dual Voltage Operation of Relays and Crossbar Switches," by A. C. Mehring and E. L. Irwin, published in the Bell System Technical Journal for November 1955, vol. 34, No. 6, pages 1225 through 1240. The line appearance or line contacts are similar to the line terminations of the subscriber's line as described in thte above-identified Busch patent. The normal or regular subscriber's line appearance or line link appearance is provided with the line relay and the cut-off relay of the type disclosed in the above-identified Busch patent. The auxiliary line link appearance may be similarly equipped with the line relay, and a cut-off relay, but it also need not be so equipped since during normal operation such calls will not be originated over the above-described auxiliary line terminals. Lines 100 represent the regular line terminals or line appearance of a subscriber's line.

Originating calls from the given subscriber station such as 150 are transmitted over the line conductors to the telephone switching system 50. The telephone switching system, as well as the auxiliary telephone subscriber's line circuits and the associated equipment operate in the usual manner as described in the above-identified patent of A. J. Busch. It is noted that all of the contacts of both the T relay 32 and the B relay 28 are normal and unoperated at this time. Thus contacts T–14, B–16, B–17, B–18, T–15 and T–19 are all open and remain in their normal condition and thus do not interfere wtih the use of this line circuit at this time. Likewise, the break contacts T–10, T–11, B–12 and B–13 are also normal and do not effect the operation of the subscriber's line at this time.

Consequently, if the subscriber's station 150 originates a call, the central office equipment will respond thereto in the usual manner and the equipment in accordance with this invention will remain in its idle or normal condition.

Likewise, if a call is directed to the subscriber's station 150 it will be directed over the first choice set of terminals or line appearance 100 and cause the subscriber's bell to ring. A subscriber may answer the call and later terminate the call whereupon the circuits of the Busch application as well as the subset 150 and the lines connecting the subset with the central station operate in their usual manner. If a call is directed to the subscriber station 150 during the time this station is busy due either to having been called or having originated a call the regular line terminals or line appearance 100 will be busy in the switching system 50. Inasmuch as the switching system is arranged to hunt over the individual terminals or appearances of a group of line terminals or appearances including the regular line appearance 100 and at least one auxiliary set of line terminals or appearance 200, the equipment will test the auxiliary line terminals 200 and finding them idle will set up a connection to these terminals in the normal manner. The condenser 41 and resistor 42 simulate the ringing circuit in the usual subscriber station set so that marker in the switching system 50 satisfactorily completes the subscriber's line continuity test and thus sets up a connection to these terminals.

The switching equipment or system 50 is in accordance with the system disclosed in the above-identified patent to A. J. Busch when modified as described above.

When a system of this type sets up a connection to a set of line terminals such as the auxiliary line terminals or appearance 200, a positive 130 volts is momentarily applied to the sleeve conductor S which causes the holding magnet 37 to operate and complete the connection through the associated crossbar switch of the switching system 50 to the idle set of line terminals 200 designated T, R and S.

The momentary application of the positive 130 volts to the sleeve conductor S to operate the hold magnet 37 at this time is from a charged condenser as described in the above-identified article. This voltage is sufficient to momentarily operate the B relay 28 through the normal contacts 0–27 of the 0 relay 25 and diode 29. This voltage, however, does not cause the operation of the T relay 32 at this time due to the action of the inductor 31 connected in series with the relay. At this time the make contacts 0–26 of the 0 relay 25 are open because relay 25 is not operated at this time.

The operation of the B relay 28 closes contacts B–22 which complete a circuit for the operation of the A relay 23 from ground on the sleeve of the busy regular line terminals or appearance 100. As a result, the A relay 23 operates and in turn closes contacts A–21 thus completing a holding path for A relay 23 from the sleeve conductor S of terminals 100 through the break contacts T–20 of the T relay 32 and the operated contacts A–21 of A relay 23.

In addition, A relay 23 in operating also closes contacts A–34 which shunt the 48 volts through resistor 33 applied to the terminal of the T relay 32 thus preventing the operation of this relay from ground connected to the sleeve terminal S of the auxiliary line appearance of terminal 200. The ground is applied to this terminal after the condenser has discharged terminating the application of a positive 130 volts. As a result T relay 32 does not operate at this time.

As described above, the B relay 28 is operated due to the momentary application of the positive 130 volts to the sleeve conductor S of the auxiliary line terminals of appearance 200. Upon the termination of this positive voltage from the sleeve, the diode 29 prevents the negative 48 volts through the hold magnet 37 from holding the B relay 28 operated. Relay 28 is a slow-release relay so that it will be operated and remain operated for an appreciable interval of time due to the momentary application of the positive 130 volts to the sleeve conductor.

During this momentary operation of relay 28 in addition to closing the contacts B–22 and causing the operation of the A relay 23 as described above, the momentary operation of relay 28 closes contacts B–18 which connect the resistor 43 across the T and R conductors of the first line appearance 100, thus maintaining the connection through the automatic switching equipment. In addition, the momentary operation of relay 28 opens the contacts of B–12 and B–13 and closes the contacts B–16 and B–17. As a result, the call waiting tone supply 35 is connected to the subscriber's station 150 or subset and at the same time the connection extending back through the switching system to the other subscriber of the first or busy call is interrupted. Thus, the subscriber station 150 receives a spurt of call waiting tone from the tone supply 35, while the other subscriber to this call receives no such tone. These conditions prevail as long as relay 28 remains operated. Upon the release of relay 28 contacts B–18 open, contacts B–12 and B–13 reclose and contacts B–16 and B–17 open thus restoring the circuit of the first connection to the subscriber station 150 to its original condition whereupon this subscriber can again converse with the subscriber who either called him or whom he called.

During this time, the subscriber calling the subscriber station 150 who is connected to the auxiliary line terminal or appearance 200 will receive ringing indication tones thus indicating that the subscriber station set is being rung. So long as all of the subscribers maintain their instruments off normal the above-described set of conditions continue. If at this time still another subscriber calls the station 150 both the regular and the auxiliary line terminals 100 and 200 will test busy. If there are no other sets of terminals, busy tone will be returned to this subscriber. If additional sets of line terminals or appearances are provided and interconnected in a manner similar to the manner in which the sets 100 and 200 are connected, then this call will be directed to such additional auxiliary line terminals or appearance.

In case the calling party on the second call hangs up, first the hold magnet 37 will release and the connection from his line to the second or auxiliary set of line terminals or appearances will be interrupted and the corresponding circuits in the switching system 50 restored to normal. Thereafter, when the first call is terminated the switching system 50 will restore the circuits to normal and the A relay 23 will likewise release due to removal of ground from the sleeve conductor S of the first set of line terminals or appearance 100.

If, however, the first call is terminated first then the connections through the switching system 50 to the regular set of line terminals or appearance 100 will be interrupted with the result that ground is removed from the sleeve conductor S of this set of line terminals and, as a result, the hold magnet 38 and the relay 23 both release. If the calling subscriber of the second call has not terminated the call at this time ground will still be connected to the sleeve terminal conductor S of the auxiliary set of line terminals or line appearance 200 by the switching system 50. As a result, upon the release of relay 23 contacts A–34 will open and remove the shunt from around the resistor 33. Consequently, the T relay 32 will operate at this time in a circuit extending from battery through resistor 33, winding of relay 32, inductor 31 to ground connected on the S conductor of the auxiliary set of line terminals or line appearance 200 in the switching system 50.

Relay 32 in operating causes contacts T–10 and T–11 to open disconnecting the subscriber's line conductors from the regular set of line terminals or appearance 100 and contacts T–14 and T–15 will close connecting the line conductors of the subscriber's station 150 to the T and R conductors of the auxiliary set of line terminals or appearance 200. The operation of relay 32 also causes contacts T–19 to close and contacts T–36 to open. The operation of contacts T–36 removes the resistor 42 and the condenser 41 from across the T and R conductors of the auxiliary set of line terminals. The contacts 19 in closing connect a condenser 44 and resistor 45 across the T and R conductors of the regular set of line terminals or appearance 100 which will simulate a ringer in a subscriber station set so that should another call be directed to the subscriber's station set 150 during the time it is busy due to the above-described call over the auxiliary set of line terminals or appearance 200, the marker circuit in the switching system 50 can satisfactorily complete a continuity test to the then called subscriber's line.

The connection of the T and R terminals or conductors of the auxiliary set of line terminals or appearance 200 to the subscriber's line conductors extending to the subscriber's station 150 will now cause ringing current to be applied to these line conductors and cause the subscriber's bell to ring and the subscriber in answering a call will actuate the switching equipment in the switching system 50 in the usual manner. Thereafter, the call may be terminated in the usual manner at which time the hold magnet 37 and relay 32 will both release and restore the circuits to their initial or idle condition.

If before the call over the auxiliary line terminals or appearance 200 is terminated another call should be directed to the station set 150, the regular set of line terminals or appearance 100 will now test idle so that the marker of the switching system 50 will establish a path from this new calling subscriber to these set of line terminals. As pointed out above, the condenser 44 and resistor 45 and closed contacts T–19 provide a path for permitting the marker to satisfactorily complete a continuity test over the conductors T and R of the regular set of line terminals 100. In addition, the hold magnet 38 is operated and since the T relay 32 is operated contacts T–24 are closed and as a result the 0 relay 25 operates.

As described herein, the switching system 50 will apply positive 130 volts for a brief interval of time to the S conductor of the regular line appearance at this time to cause the hold magnet 38 to operate in a very short interval of time. This high voltage will also cause the 0 relay 25 to operate in a very brief interval of time and open contacts 0–27 and close contacts 0–26 thus disconnecting the winding of relay 28 from the sleeve or S terminal or conductor of the auxiliary set of line terminals or appearance 200 and connect the winding of relay 28 through the diode 29, resistor 30 and operated contacts 0–26 to the sleeve or S conductor of the regular set of line terminals or appearance 100. The operation of relay 25 is sufficiently fast so that the B relay 28 will operate in response to the positive 130 volts momentarily applied to the S or sleeve conductor of the regular set of line terminals 100 and in substantially the same manner as described above in response to the momentary application of the positive 130 volts to the S or sleeve conductor of the auxiliary set of line terminals or appearance 200. As before, the operation of relay 28 causes the contacts B–12 and B–13 to open and disconnect the calling subscriber connected to the line conductors over the auxiliary set of line terminals 200 and also causes contacts B–18 to close thus maintaining the path through the switching system 50 to this subscriber.

Also, the operation of relay 28 causes contacts B–16 and B–17 to close and connect the call waiting tone signal to the line conductors of the subscriber's station 150, thus indicating that another call is waiting. Relay 28 is only momentarily operated as described above so that this tone is applied for a short interval of time after which the connection is between the subscriber's station set 150 and the calling subscriber connected through the switching system 50 to the auxiliary set of line terminals or appearance 200 is reestablished whereupon the subscribers can again communicate with each other.

As before, if the subscriber connected to the regular set of line terminals disconnects first hold magnet 38 and relay 25 will release and the circuits in the switching equipment 50 likewise will be restored to normal. Thereafter, when the subscriber connected through the switching equipment to the auxiliary set of line terminals 200 terminates a call, these circuits will be restored to their initial or idle condition in the usual way.

If, either the subscriber connected to the auxiliary set of line terminals or appearance 200 through the switching equipment or the subscriber at the subscriber's station set 150 terminate the call before the subscriber connected to the regular set of line terminals or appearance 100 terminates a call then ground will be removed from the sleeve or S conductor of the auxiliary line terminals or appearance 200 with the result that the hold magnet 37 and relay 32 will release. As a result, the connection between the T and R conductors of the auxiliary set of line terminals or appearance 200 is interrupted and the subscriber's line terminals connected to the T and R conductors of the regular set of line terminals or appearance 100. Thereupon, the subscriber's bell at station 150 will ring and the subscriber may answer the call in the usual manner whereupon both in the switching system 50 and the auxiliary line circuits shown in the drawing respond in the manner described above.

In the foregoing descriptions, it has been assumed that a regular set of line terminals or appearance 100 and one auxiliary set of line terminals or appearance 200 has been provided for each subscriber line desiring the feature of being notified of a call waiting and being permitted to receive the new call if the existing call is terminated sufficiently soon. More than one set of auxiliary line terminals or appearances may be provided if traffic conditions warrant and these additional auxiliary terminals may be interconnected with the regular set of line terminals or appearance and the auxiliary set of line terminals or appearance shown in the drawing in a similar manner.

Other modifications may be made by those skilled in the art without departing from my invention. Thus in the arrangement described herein wherein the alerting tone is prevented from reaching the other party on the prior conversation by opening the talking path for the duration of the tone interval while maintaining supervision of the trunk circuit by a suitable resistance across the tip and ring conductors, clicks may be heard at both ends of the connection when the connection is broken and again when the connection is reestablished by the B relay. Furthermore, conversation is interrupted for the short tone interval. If this should prove undesirable, the alerting tone may be applied to the tip and ring conductors of the called subscriber through a pair of repeat coils. At the same time, an inductor and capacitor, connected in series, are cut into the circuit across the tip and ring conductors to the other side of the repeat coils than the called subscriber with the L and C combination designed to be at series resonance at the tone frequency. In this manner the tone may be applied to the called subscriber without interrupting the direct-current path of the prior connection.

It is, therefore, to be understood that the above described arrangements are illustrative of the application of the principles of the invention and that numerous other arrangements may be devised by those skilled in the art without departing from the spirit and scope of the invention. Specifically, while the invention has been described with reference to connection to a crossbar system of the type described in the above-mentioned Busch patent, the invention is not limited in applicability to any particular central office switching systems and may be equally utilized with other central office switching systems.

What is claimed is:

1. In combination, in a telephone switching system a telephone subscriber's line, two sets of selectable line terminal appearances therefor, means for selecting either of said line terminal appearances when they are not busy, means responsive to the selection of either of said line terminal appearances when the other of said line terminal appearances and said line are busy for transmitting a call-awaiting tone to the subscriber's line, and means responsive to the termination of the busy call for interconnecting the subscriber's line with the said other terminal appearance, and means for thereafter applying ringing current to the subscriber's line for calling the subscriber.

2. In a telephone system, a telephone subscriber's line, two sets of selectable line terminal appearances therefor each set including a sleeve terminal appearance, means for connecting said line to one of said line terminal appearances, means for simulating a subscriber's line connectable to each of said line terminal appearances, means responsive to the selection of either of said line terminal appearances when the other of said line terminal appearances and said line are busy for transmitting a call-awaiting tone to the subscriber's line, said tone transmitting means including a tone source, a first relay having a winding, means for selectively connecting said first relay winding to said sleeve terminal appearances, and means including contacts of said first relay for connecting said tone source to the subscriber's line and for preventing transmission of said tone to the other subscriber interconnected with the subscriber's line, means responsive to the termination of the busy call for interconnecting the subscriber's line with the other of said line terminal appearances, said interconnecting means including a transfer relay having contacts and a winding connected to one of sleeve terminal appearances and means for changing the condition of said transfer relay on termination of said prior busy call including a contact of a relay connected to the other of said sleeve terminal appearances, and means for preventing energization of said transfer relay on energization of said first relay.

References Cited in the file of this patent

UNITED STATES PATENTS

| | | |
|---|---|---|
| 2,278,752 | West et al. | Apr. 7, 1942 |
| 2,497,782 | Lomax | Feb. 14, 1950 |
| 2,510,011 | Corbett | May 30, 1950 |
| 2,911,478 | Lomax | Nov. 3, 1959 |